United States Patent [19]

Siren

[11] Patent Number: 4,878,451
[45] Date of Patent: Nov. 7, 1989

[54] ALL-TERRAIN AMPHIBIAN VEHICLE

[76] Inventor: Andy O. Siren, 10011 Fairmount Drive, South East, Calgary, Alberta, Canada, T5J 0S6

[21] Appl. No.: 133,732
[22] Filed: Dec. 16, 1987
[51] Int. Cl.⁴ ............................................. B63B 35/00
[52] U.S. Cl. .................................. 114/270; 114/77 R; 180/14.1; 180/14.7
[58] Field of Search .................. 114/77 R, 270; 180/14.1, 14.4, 14.7; 74/11, 15.2, 15.69; 296/198; 440/38

[56] References Cited

U.S. PATENT DOCUMENTS

| | | | |
|---|---|---|---|
| 3,204,713 | 9/1965 | Shanahan et al. | 114/270 |
| 3,353,618 | 11/1967 | Fisher | 180/14.4 |
| 3,362,373 | 1/1968 | Mycroft | 114/270 |
| 3,435,798 | 4/1969 | Rieli | 114/270 |
| 3,444,837 | 5/1969 | Donofrio | 114/270 |
| 3,653,455 | 4/1972 | Hetteen | 180/14.1 |
| 3,939,794 | 2/1976 | Hull | 440/38 |
| 4,452,163 | 6/1984 | Ayeva | 114/77 R |

FOREIGN PATENT DOCUMENTS 1012069 6/1977 Canada .

Primary Examiner—Sherman D. Basinger
Attorney, Agent, or Firm—Murray E. Thrift; Stanley G. Ade; Adrian D. Battison

[57] ABSTRACT

An amphibious vehicle may be connected end-to-end with a series of other similar vehicles to provide an amphibious vehicle train. Each vehicle has a hull with a plurality of wheels mounted on each side. Two drive trains are provided for driving the trains on respective sides of the hull. The drive trains can be driven at differential speeds to steer the vehicle. At each end of the vehicle are two power take-off means, one for each drive train coupled to a similar power take-off in the next adjacent vehicle. The power plant for the complete train is found in a single unit.

11 Claims, 4 Drawing Sheets

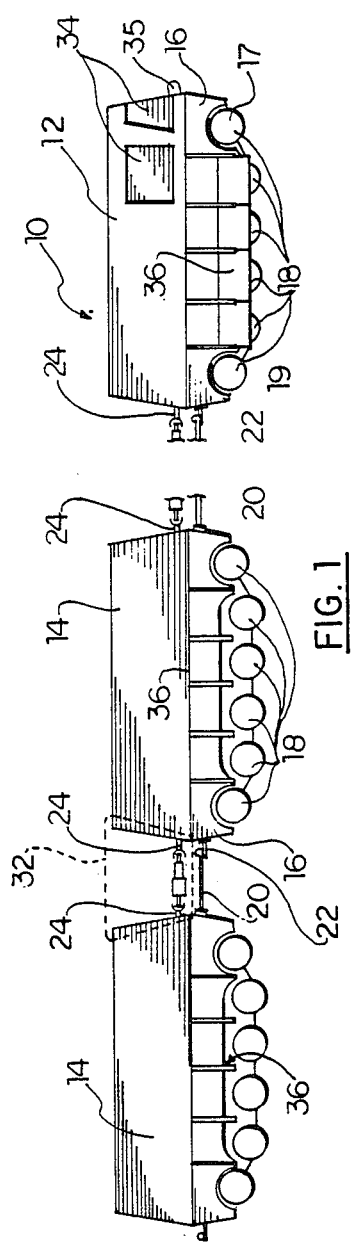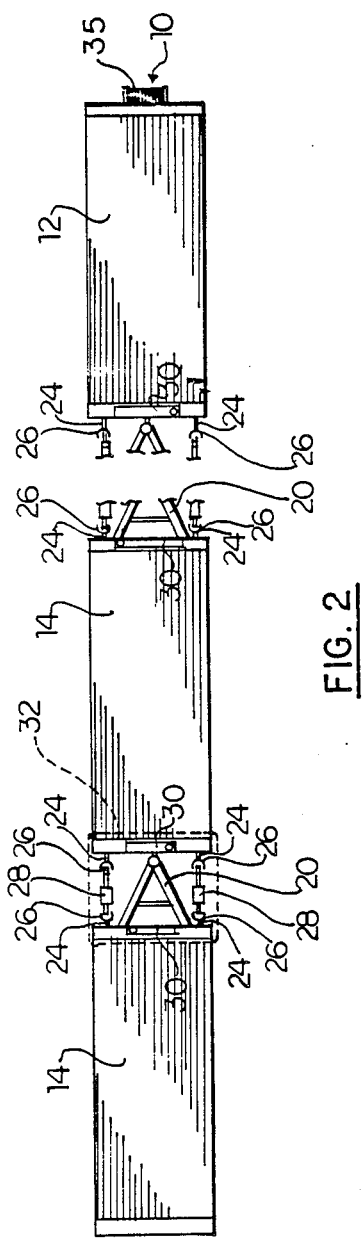
FIG. 1
FIG. 2

ALL-TERRAIN AMPHIBIAN VEHICLE

FIELD OF THE INVENTION

The present invention relates to all-terrain amphibian vehicles and more particularly to all-terrain amphibian vehicles that can be arranged end to end to form a train.

BACKGROUND

The applicant's Canadian Patent No. 1012069 describes an all-terrain vehicle with three wheels on each side and planing hull. The vehicle incorporates a drive system employing variable pitch pulleys to provide a differential drive to the wheels on opposite sides. This differential drive system is used for steering the vehicle.

SUMMARY

The present invention uses a drive of this type in an amphibious vehicle that may be linked end-to-end with other vehicles of a similar type to provide an amphibious all-terrain vehicle that may be linked end to end with other vehicles of the same type to provide an amphibious all-terrain train.

According to the present invention there is provided an amphibious vehicle comprising:
  a hull;
  a plurality of wheels mounted on each side of the hull;
  drive means including two drive trains for driving the wheels on respective sides of the hull and means for varying speeds of the drive trains in respect to one another;
  power take-off means associated with each drive train at at least one end of the vehicle for driving connection to a drive train of another, similar vehicle.

The invention also provides a train of such vehicles arranged end-to-end and articulately interconnected. The power take-offs of adjacent ends of adjacent vehicles are interconnected so that all of the wheels on one side of the train are driven at the same speed. The driving power for the train is derived from an engine in the lead vehicle.

BRIEF DESCRIPTION OF THE DRAWINGS

In the accompanying drawings, which illustrate the exemplary embodiment of the present invention:
FIG. 1 is a side elevation of a train;
FIG. 2 is a plan view of the train.

DETAILED DESCRIPTION

Figure 3:
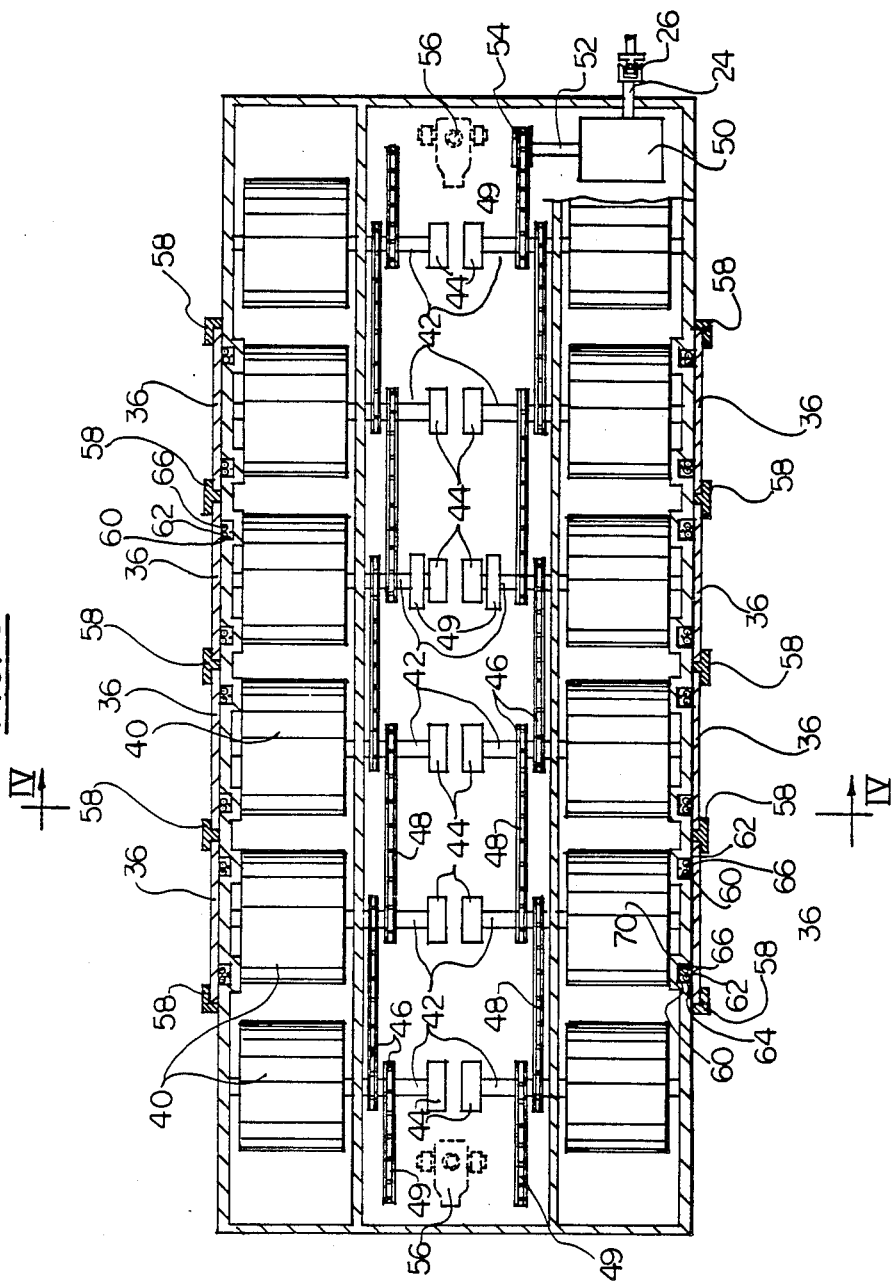
FIG. 3 is a sectional view showing the power train.

Referring to the accompanying drawings, and particularly to FIGS. 1 and 2, there is illustrated an all-terrain amphibian train 10. The train has a lead unit 12 and a series of following units 14, two of which have been illustrated in FIGS. 1 and 2. Each unit consists of a hull 16 with six wheels 18 located on each side. The leading and trailing wheels 17 and 19 respectively are located somewhat higher than the four centrally located wheels. Each of the following units 14 is equipped with a triangular towing hitch 20 that hooks onto a towing ball 22 on the immediately preceding unit in the train. Each unit is also provided with two power take-offs 24 at each end adjacent another unit. The adjacent power take-offs of adjacent units are connected by a drive line consisting of two universal joints 26 and telescoping spline shaft 28.

Adjacent ends of the two units are fitted with doors 30. Where desired, a weather shield 32 may be fitted between the ends of adjacent units so that personnel may move from one unit to another in relative comfort despite inclement weather conditions.

The lead unit 12 is illustrated as having windows 34 at the front and sides. The other units may also be equipped withwindows as necessary or desirable to provide for visibility. At the front of the lead unit is an electric winch 35. Similar winches may be provided on the other units, as required.

Figure 4:
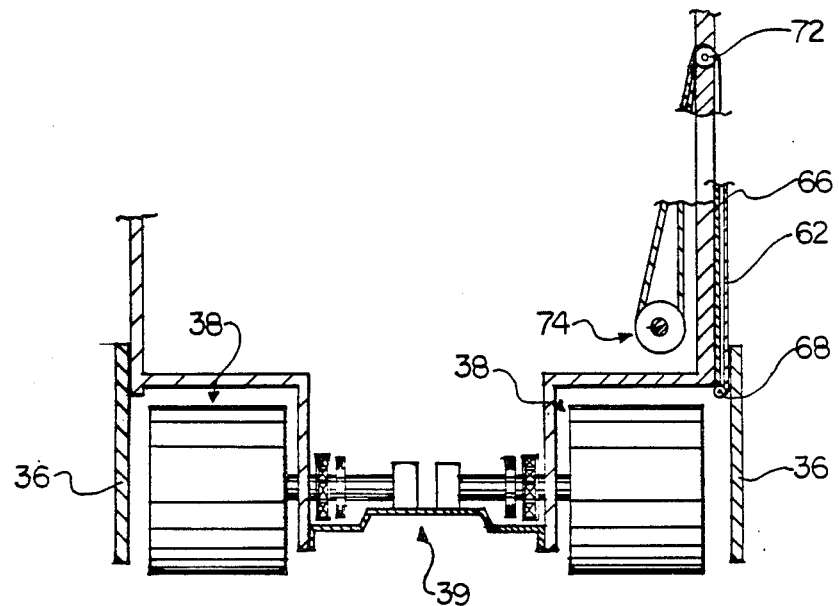
FIG. 4 is a section along line IV—IV FIG. 3.

Each unit has, one each side, four water fenders 36, each in the form of a panel that slides up and down along the side of the vehicle between a raised position shown on the following units 14 in FIG. 1 and a lowered position covering one of the center wheels as shown on the leading unit 12 in FIG. 1. As illustrated in FIG. 4, when the water fenders on one side are all lowered they close the outer side of the wheel well to provide a tunnel-like structure in which the wheels operate. The fenders are independently operable, as will be described in the following.

A driving mechanism for the wheels is illustrated most particularly in FIG. 3. As shown in that Figure, each wheel is equipped with a large, low pressure tire 40 and is mounted on a shaft 42 supported in a bearing 44 at its inner end and a further bearing where it passes through the hull of the vehicle. That portion of each shaft inside the vehicle is equipped with two chain sprockets 46 that are entrained by chains 48 extending about similar sprockets on each two adjacent shafts 42. With this arrangement, the wheels on each side of the vehicle will rotate in unison.

The extra sprocket on each shaft 42 at the end of the series of shafts carries a chain 49 that is entrained about a sprocket 54 mounted on an input shaft 52 of a power take-off 50. The output of the power take-off passes through the end of the hull of the vehicle to serve as one of the power take-offs 24 to link the drive train on the associated side of the vehicle with the drive train on the same side of the next vehicle in the train.

Two of the shafts 42 at the center of the unit, one on each side, are equipped with brakes 49, operable by the driver of the train. Additional brakes may be used where necessary or desirable.

FIG. 3 also illustrates, in phantom, two water jets 56 located near the ends of the unit, at the lateral centre. The water jets are mounted on lateral shafts 57, so that they can be oriented forwards, aft, or down through use of an appropriate operator control (not shown). The jet mounting also includes a vertical pivot, allowing the jets to swing to one side or the other of the unit.

The water fenders 36 of the illustrated unit are each guided by two guides 58 mounted on the outside of the vehicle hull. The raising and lowering cables 62 and 66 are accommodated in channels 60 formed in the side wall of the hull, confronting the fenders. The lift cables 62 have their ends connected to fittings 64 on the fenders and extend upwardly from the fitting, while the lowering cables 66 pass around sheaves 68 mounted on the hull at the bottom of thechannels 60 and then up to fittings 70 on the fenders. As illustrated in FIG. 4, both the lifting cable 62 and the lowering cables 66 pass over sheaves 72 mounted in openings in the slide wall of the vehicle hull 16 and thence to a winching assembly 74 that is illustrated most particularly in FIG. 5. The illustrated which consists of two pairs of winch drums 76, 77 mounted at opposite ends of a shaft 78. The shaft is mounted for rotation on the vehicle by two bearings 80 adjacent its opposite ends. The two end drums 76 are secured to the shaft by rollpins 82 and to the adjacent drums 77 by teeth 84 on the end face of the drum 76 engaging similar teeth on the adjacent drum 77.

Figure 5:
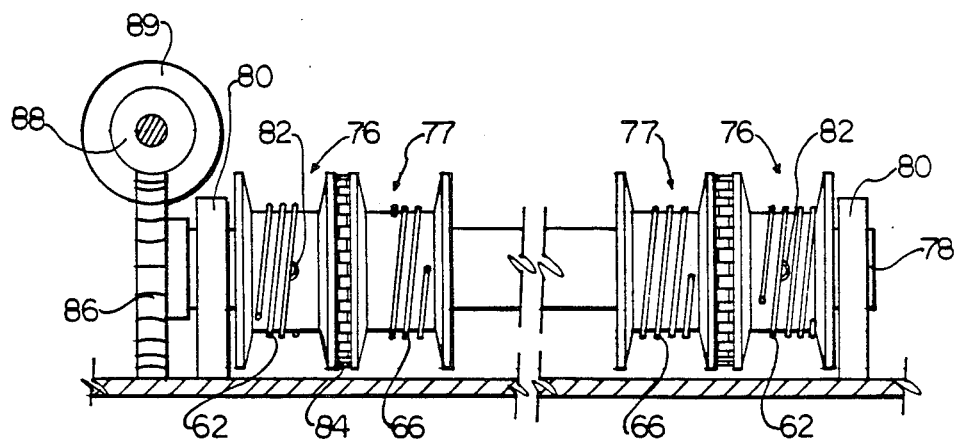
FIG. 5 is a detailed view of a water fender operating mechanism.

The shaft 78 is driven by a worm gear 86 mounted on the shaft outside of the bearing 80. The worm gear 86 is in turn driven by a worm 88 from an electric motor 89 that can be controlled from inside the vehicle. As illustrated in FIG. 5, the cables 62 for each fender are wound on the drums 76, while cables 66 are wound on drums 77. The cables 62 and 66 are wound on the respective drums 76 and 77 in opposite directions so that in rotating the drums, one cable will be reeled in while another will be paid out.

The cross-sectional configuration of the hull is illustrated most particularly in FIG. 4. As shown, the two wheel wells 38 are located on opposite sides of a centre section that is recessed to provide a shallow tunnel 39. When the water fenders 36 are in their lowered positions, the tires 40 are housed in effective tunnels as well.

Figure 6:
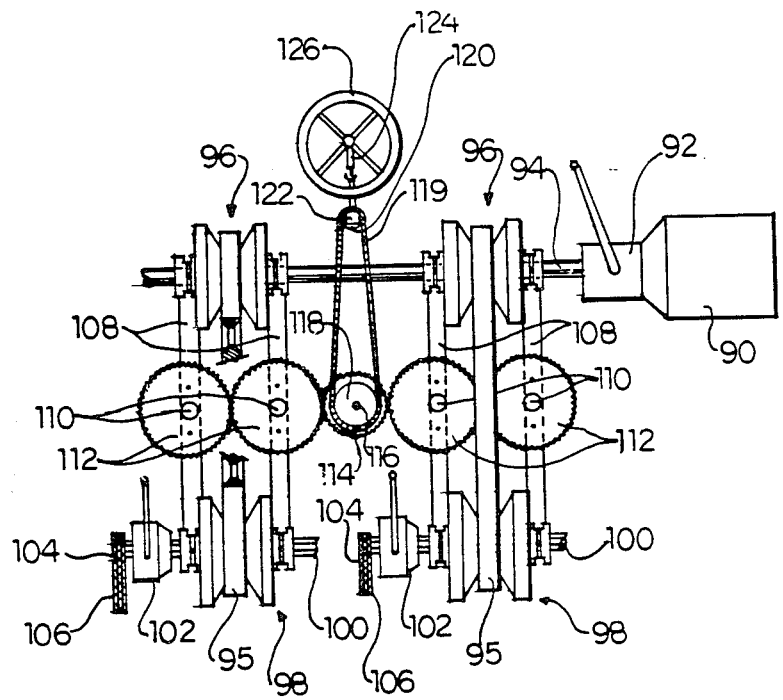
FIG. 6 is a representation of the drive system.

The propulsion system for the train is carried in the leading unit 12 of the train. It is a modified version of the system disclosed in the applicant's Canadian Patent No. 10012069. Referring to FIG. 6 of the drawings, the propulsion system includes an engine 90 coupled through a clutch 92 to a shaft 94. The shaft 94 carries two input pulleys 96 that drive respective output pulleys 98 carried on output shaft 100 via V-belts 95. The output shafts are connected to transmissions 102 which in turn drive sprockets 104 within entrained chains 106.

The input and output pulleys are variable pitch devices with opposite sides of each pulley mounted on the ends of two beams 108 mounted on respective pivots 110. The beam carry meshing gears 112, with the inner gears 112 in mesh with a steering gear 114 mounted on a shaft 116. The shaft 116 also carries sprocket 118 in mesh with a chain 119 also entrained above a sprocket 120 of a steering head 122. The steering column 124 of the steering wheel 126 drives the steering head 122 and through it the sprocket 120s and 118 and thence the steering gear 114. Rotation of the steering gear 114 acts to vary the pitch of the two pulley drives in opposite directions so that the inputs to the two transmissions 102 will vary. The transmissions drive the drive trains for the wheels on opposite sides of the unit so that varying the ratio of speeds of the two transmission outputs will produce a differential speed as between the two wheel sets and will therefore steer the vehicle.

It will thus be seen that the one source of power, which is preferably but not necessarily located in the leading unit 12, can transmit driving power to all units hitched to the train and cause appropriate steering of each unit.

The trailing units 14 of the train may consist of life support tenders, fuel/food tenders, shelters, and the like.

When the train is used in water, the outer water fenders 36 are in the lowered position with the lower edges substantially flush with the bottom of the tires, thus producing a "traction" effect as the wheels are rotated at relatively high speeds within the water and direct the water driven by the wheels to the rear. The water jets located centrally of each unit may direct water through the central shallow tunnel giving a lifting or planing effect to the train when used on water. The jets also provide a forward, reverse or side thrust, or a lifting force, depending on their orientation.

On land, the water fenders are raised and the unit acts as aconventional all-terrain land unit with drive to all wheels in the train.

When the vehicles are on land, the water fenders are usually in the raised position unless the vehicles are stationary, in which case they may be lowered in contact with the ground to improve the overall insulation value of the entire structure and to assist in maintaining the desired temperature within.

The fender positions may be adjusted independently by independent controls at the operator's station to alter the handling characteristics of the train. For example, in water variations in the fender position will vary the drag, a characteristic that will be of assistance in turning.

The amphibious train of this application is designed to operated under most conditions such as over land including "floating" over fragile tundra and other sensitive areas. It is intended to operate over water, swamp and bogs, snow, ice and sand without trenching or otherwise spoiling the environment. The train may climb and descend slopes and hills under the most adverse climatic and environmental conditions.

I claim:

1. An amphibious vehicle comprising:
   a hull;
   a plurality of wheels mounted on each side of the hull;
   drive means including two drive trains for driving the wheels on respective sides of the hull and means for varying speeds of the drive trains in respect to one another;
   power take-off means including two power take-offs associated with respective ones of the drive trains at at least one end of the vehicle for driving connection to the respective drive trains of another, similar vehicle.

2. A vehicle according to claim 1 wherein said drive means include engine means for driving said two drive trains.

3. A vehicle according to claim 1 wherein the hull comprises a tunnel formed centrally between the wheels on opposite sides of the vehicle.

4. A vehicle according to claim 3 including an elongate wheel well on either side of the tunnel, accomodating the wheels.

5. A vehicle according to claim 3 including a water jet mounted in the tunnel for directing a water flow along the tunnel.

6. A vehicle according to claim 5 including two water jets mounted at opposite ends of the tunnel.

7. A vehicle according to claim 5 including a weather shield joining adjacent ends of adjacent vehicles, each said vehicle having a door in the end thereof.

8. A train of amphibious vehicles according to claim 1 wherein the vehicles are articulately interconnected with the power take-off means at the adjacent ends of adjacent vehicles connected one to the other.

9. An amphibious vehicle comprising:
   a hull;
   a plurality of wheels mounted on each side of the hull;
   a tunnel formed in the hull centrally between the wheels on opposite sides of the vehicle;
   an elongate wheel well on either side of the tunnel, accomodating the wheels;

drive means including two drive trains for driving the wheels on respective sides of the hull and means for varying speeds of the drive trains in respect to one another;

power take-off means including two power take-offs associated with respective ones of the drive trains at at least one end of the vehicle for driving connection to the respective drive trains of another, similar vehicle; and at least one movable fender on each side of the vehicle, with a raised position positioned along the side of the hull, and a lowered position projecting below the side of the hull and enclosing the outer side of the wheels.

10. A vehicle according to claim 9 including a plurality of movable fenders on each side of the vehicles.

11. A vehicle according to claim 10, wherein each wheel has a respective moveable fender associated therewith.

* * * * *